United States Patent [19]
John

[11] Patent Number: 6,012,357
[45] Date of Patent: *Jan. 11, 2000

[54] INSULATION STRIPPING TOOL

[76] Inventor: David W. John, 15000 S. Arapaho Dr., Olathe, Kans. 66062

[ * ] Notice: This patent issued on a continued prosecution application filed under 37 CFR 1.53(d), and is subject to the twenty year patent term provisions of 35 U.S.C. 154(a)(2).

[21] Appl. No.: 08/855,354

[22] Filed: May 13, 1997

[51] Int. Cl.[7] .................................................... H02G 1/12
[52] U.S. Cl. ................. 81/9.44; 30/90.1; 7/106
[58] Field of Search ............................ 81/9.4, 9.44, 423; 30/90.1, 329; 7/106

[56] References Cited

U.S. PATENT DOCUMENTS

| | | | |
|---|---|---|---|
| 669,556 | 3/1901 | Spring | 81/9.4 X |
| 1,276,256 | 8/1918 | O'Reardon | 81/423 X |
| 4,006,502 | 2/1977 | Strickland | 7/108 |
| 4,108,028 | 8/1978 | Perrino . | |
| 4,317,391 | 3/1982 | Gudmestad . | |
| 4,337,542 | 7/1982 | Theiler | 7/107 |
| 4,607,544 | 8/1986 | Jewell, Jr. . | |
| 4,748,871 | 6/1988 | Zdzislaw . | |
| 4,889,019 | 12/1989 | Thompson . | |
| 5,203,237 | 4/1993 | Cross . | |
| 5,295,421 | 3/1994 | Mansfield . | |

*Primary Examiner*—James G. Smith
*Attorney, Agent, or Firm*—Mark E. Brown; Litman, Kraai & Brown, LLC

[57] ABSTRACT

A tool for stripping insulation from the conductor core of a wire or cable includes a pair of longitudinal members which are pivotally interconnected. The tool also includes a pair of blade assemblies, which are removably mounted on the longitudinal members. The blade assemblies can include grooves which cooperate to form openings for passing the conductors while stripping the insulation layers therefrom. The blades can comprise resilient materials, such as polymers, to reduce the risk of cutting the conductor.

1 Claim, 5 Drawing Sheets

INSULATION STRIPPING TOOL

BACKGROUND OF THE INVENTION

1. Field of the Invention

The present invention relates generally to insulation stripping tools and in particular to an insulating stripping tool which protects the conductor in an insulated wire or cable.

2. Description of the Related Art

Insulated conductors are available in a wide range of sizes, materials and configurations. They include insulated copper wiring, multiple strand insulated wiring, coaxial cable and fiber optic cable. They can conduct electrical current and, in the case of fiber optic cable, light energy.

A common procedure involving insulated conductors involves stripping the outer, insulating material layer from the inner conducting material core. Stripping the ends of wires and cables is a procedure which is normally performed preparatory to making electrical connections with them. Various tools have heretofore been proposed for facilitating this task. For example, the Jewel, Jr. U.S. Pat. No. 4,607,544 discloses a tool for cutting, stripping and connecting electric wire. The tool includes a pair of jaws with grooves adapted for receiving the wire and stripping insulation from a length thereof.

The Perino U.S. Pat. No. 4,108,028 discloses a wire stripper with replaceable blades and an adjustable stop whereby a certain length of conductor can be exposed.

Wire strippers have also been proposed which are rotated around the wire to cut the insulation from same. For example, the Cross U.S. Pat. No. 5,203,237 discloses a rotary wire stripper with notched blades adapted for rotating around a wire to circumferentially cut the insulation for stripping same from the conductor.

A common problem with previous wire strippers is that they often cut the conductor if too much pressure is applied or if the cutting edges are positioned too closely together. Even if the conductors are not cut through, they are often notched in a manner which reduces their current-carrying capabilities. The conductors are often significantly weakened in the process of stripping insulation therefrom when the cutting edges penetrate the conductor material. Such weakened areas can cause the conductors to break or can create hot spots due to current concentrations in reduced cross-sectional conductor areas.

Accidental cutting of conductors often occurs with multiple-strand wires. With previous wire stripping tools individual wire strands are often cut in the process of stripping insulation. Other wire and cable types which are susceptible to such insulation stripping mishaps include coaxial cables, which include tubular shield conductor layers between layers of insulation and fibers, which are susceptible to damage and reduced capacity if the fiber optic cables thereof are cut.

The present invention addresses some of these problems associated with prior art insulation stripping tools, equipment and procedures. Heretofore there has not been available an insulation stripping tool with the advantages and features of the present invention.

SUMMARY OF THE INVENTION

In the practice of the present invention, a tool is provided for stripping the insulation layer from the conductor core of a wire or cable. The tool includes a pair of longitudinal members which are pivotally interconnected whereby the tool is movable between open and closed positions. A pair of blade assemblies are mounted on the members and each includes a blade with a cutting edge. Each blade also includes a plurality of grooves extending transversely there across to the cutting edge. With the tool in its closed position, opposed pairs of grooves form conductor openings which are sized to pass conductors therethrough and to strip insulation therefrom. The blades can comprise a wide variety of materials, ranging from resilient materials with relatively low durometer values for reducing the risk of cutting the conductors, to harder materials with higher durometer values, such as porcelain, which would be more effective for cutting the insulation. The material or materials comprising the blades are preferably selected based upon a balance between competing considerations of protecting the conductors from accidental cutting, and providing for effective cutting of the insulation. The blades can be either permanent and fixed-position or removable and replaceable. The tool can be adapted to various configurations of existing wire strippers.

OBJECTS AND ADVANTAGES OF THE INVENTION

The principle objects and advantages of the present invention include: providing an insulation stripping tool; providing such a tool which is usable with a wide variety of wires and cables; providing such a tool which is adapted for protecting the conductors while stripping the insulation therefrom; providing such a tool which can reduce accidental cutting of conductors in wires and cables; providing such a tool which can include replaceable blades; providing such a tool which can accommodate various sizes and materials of wires and cables; and providing such a tool which is efficient in operation, capable of a long operating life, economical to manufacture and particularly well adapted for the proposed uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
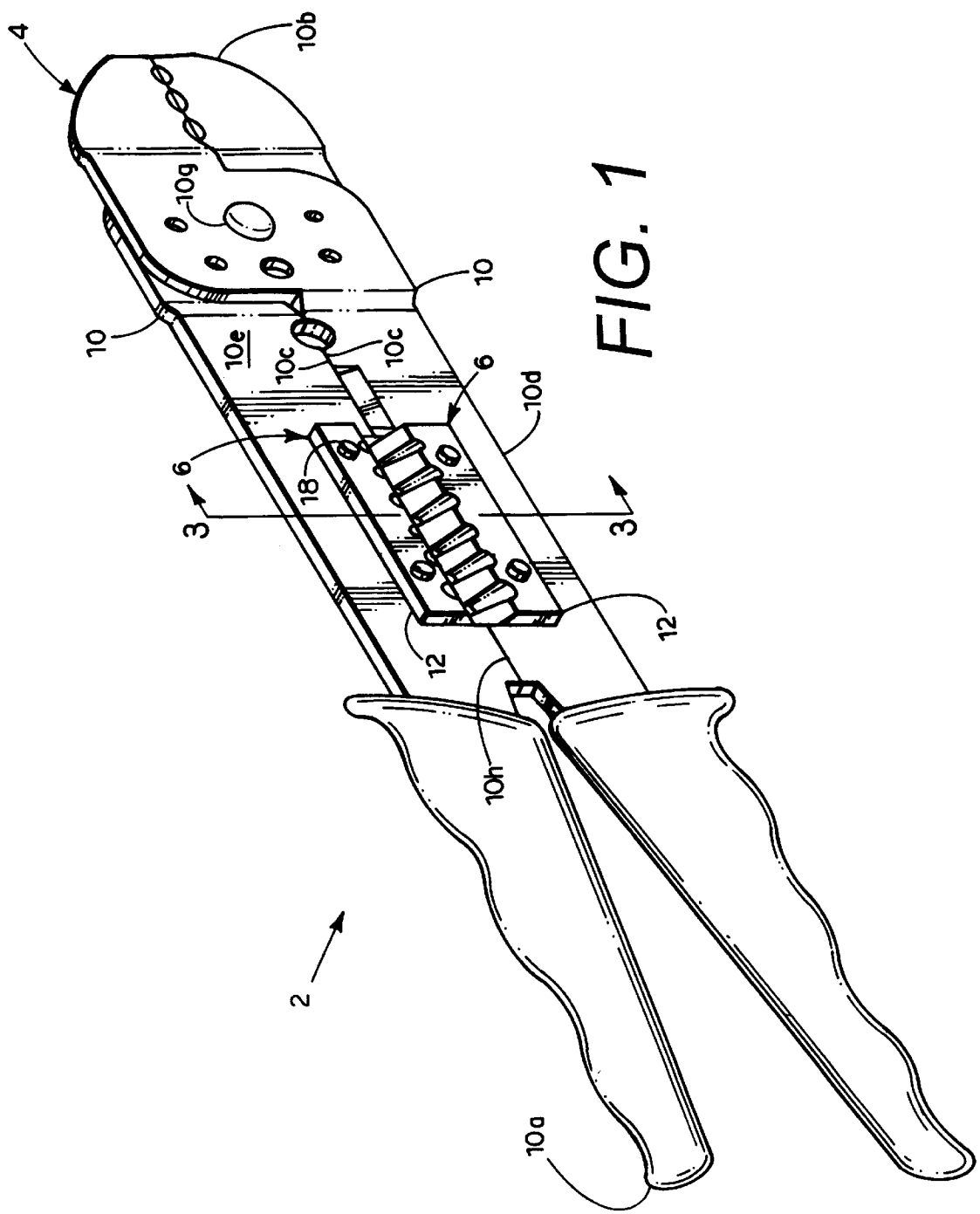
FIG. 1 is a perspective view of an insulation stripping tool embodying the present invention.
Figure 2:
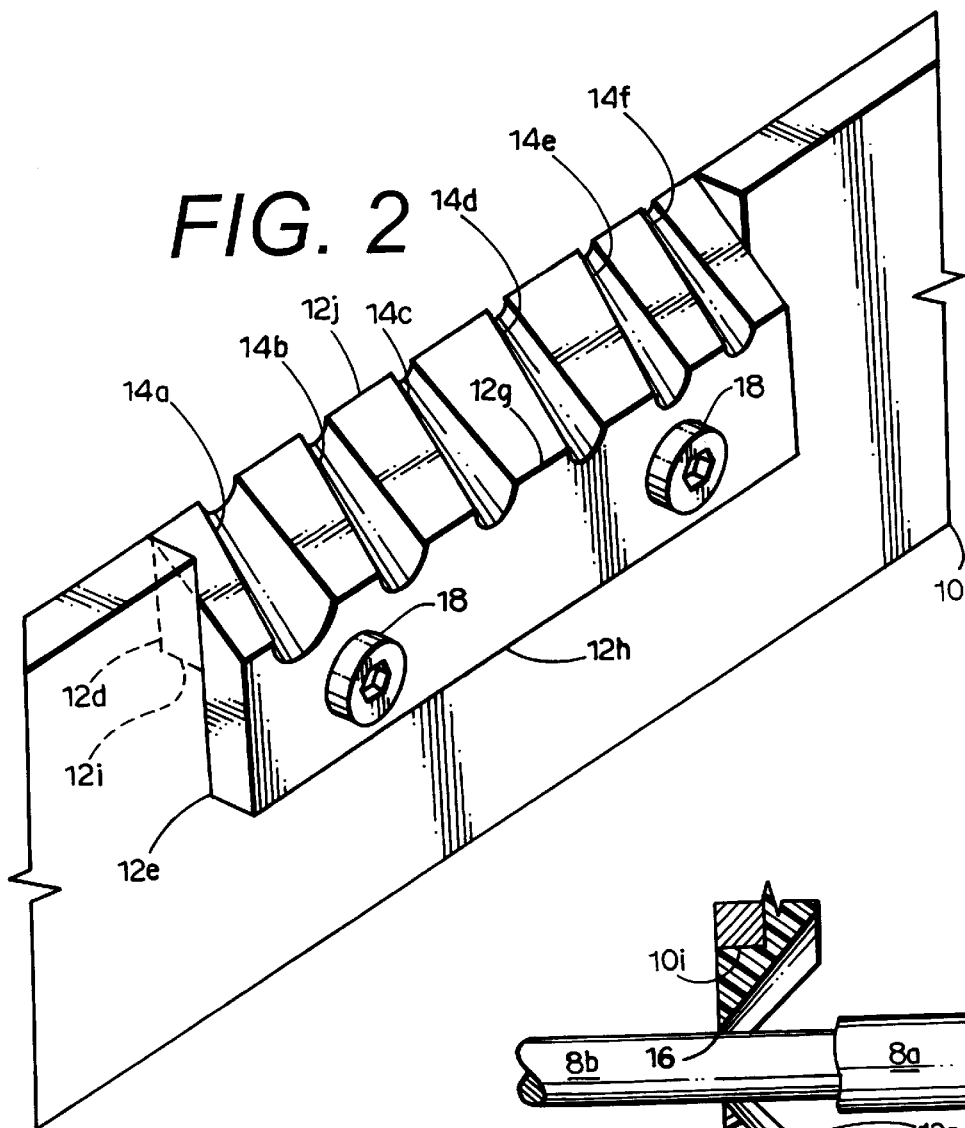
FIG. 2 is an enlarged, fragmentary, perspective view of the insulation stripping tool, particularly showing a blade assembly thereof with conventional wire-stripping notches.
Figure 3:
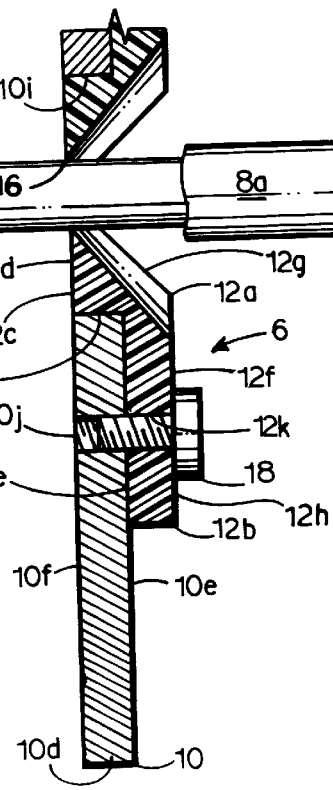
FIG. 3 is an enlarged, cross-sectional view of the insulation stripping tool taken generally along line 3—3 in FIG. 1, and showing a wire being stripped.
Figure 4:
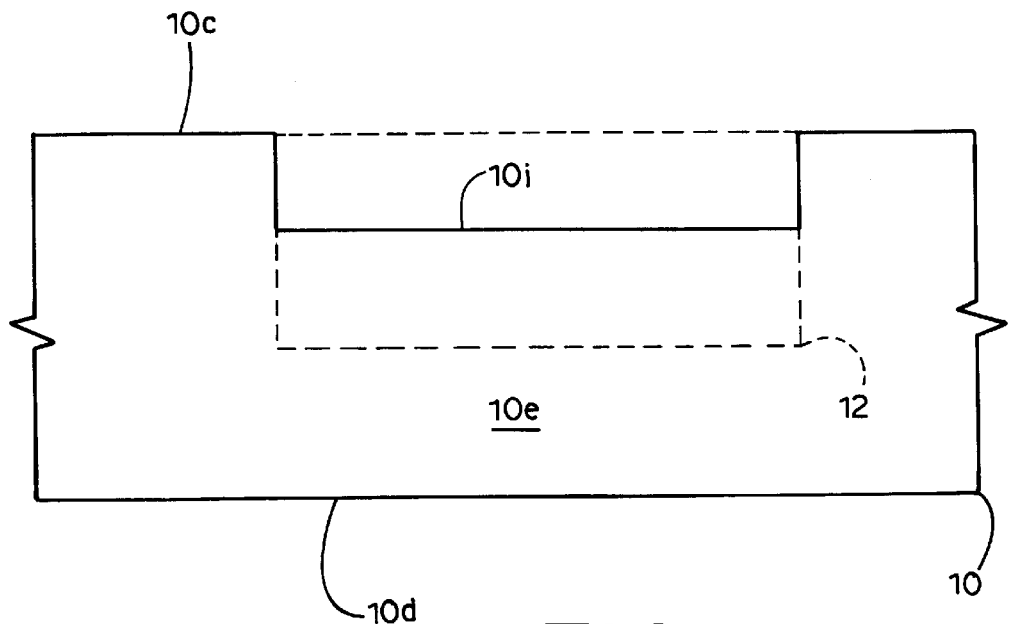
FIG. 4 is an enlarged, side elevational view of the insulation stripping tool, particularly showing the location of a notch in a longitudinal member thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates an insulation stripping tool embodying the present invention. The insulation stripping tool 2 generally comprises a leveraging plier-type device 4, which can assume various forms and can also be adapted from existing wire and cable stripping tools and the like.

The other main component of the tool 2 is a pair of blade assemblies 6 mounted on the device 4.

II. Plier-Type Device 4

Without limitation on the generality of useful devices for mounting the blade assemblies 6, a plier-type device 4 is shown which includes a pair of lever members each having proximate and distal ends 10a,b; inner and outer edges 10c,d; and inner and outer faces 10e,f. The members 10 are pivotally interconnected by a pivot 10g whereby the device 4 is pivotable between a closed position (FIG. 1) and an open position with portions of the member inner faces 10e around the pivot 10g in sliding, rotating engagement with each other. The members 10 form a pair of jaws 10h at their inner edges 10c, which mount the blade assemblies 6. Without limitation on the generality of useful devices for mounting the blade assembly 6, the device 4 as shown can be adapted from a type of tool which is commonly used for making connections, cuts, crimps, etc. with insulated wire. Such devices often include special jaws for stripping wire, which function is addressed by the present invention.

The plier-type device 4 brings the member inner edges essentially into abutting engagement in its closed position with portions of the members 10 being generally coplanar except around the area of the pivot pen 10g, where the members 10 are offset to provide for relative pivotal movement therebetween. Each jaw 10h includes a blade-mounting notch 10i open at a respective lever member inner edge 10c. Each member 10 includes a pair of threaded receivers 10j located in proximity to a respective notch 10i.

III. Blade Assemblies 6

Each blade assembly 6 includes a respective blade 12 with proximate and distal sections 12a,b. A blade inner face 12c includes inner face proximate and distal portions 12d,e respectively and a blade outer face 12f includes outer face proximate and distal portions 12g,h respectively.

The blade inner face 12c includes a shoulder 12i between its proximate and distal portions 12d,e for engaging an edge of the member notch 10i. The face proximate portions 12d,g converge to form an acute angle defining a knife or cutting edge 12j. The blade outer face proximate portions 12g thus slope proximally and inwardly to the knife or cutting edges 12j.

Each outer face proximate portion 12g includes a plurality of grooves 14a–f extending transversely there across from a respective outer face distal portion 12h to a respective knife or cutting edge 12j. With the tool 2 in its closed position (FIG. 1), opposed pairs of grooves 14a–f form respective conductor openings 16 which are appropriately sized to pass a conductor 8b therethrough while stripping a layer of insulation 8a from a wire or cable 8. Alternatively, conductor openings could be formed by only one set of grooves 14a–f on one of the blades 12, with the other blade 12 having a different edge configuration, e.g., straight, scalloped, sawtooth, etc. The grooves 14a–f and the corresponding openings 16 can be arranged in order of decreasing size as viewed from left-to-right in FIG. 1, or in any other suitable arrangement. Moreover, the particular number and sizes of the grooves 14a–f can vary. Preferably, but not necessarily, the grooves 14a–f would be sized to accommodate the gauges of wires 8 most likely to be encountered with the tool 2.

Each blade 12 includes a pair of receivers 12k extending through the blade distal portion 12h and generally aligned with respective threaded member receivers 10j. Mounting screws 18 extend through blade receivers 12k and are threadably received in member receivers 10j for mounting the blades 12 on respective members 10.

The blades 12 preferably comprise a material with a hardness compatible with the insulated conductors to be stripped thereby. For example, for relatively sensitive and fine conductors, such as fiber optic cables, a relatively soft material, such as a polymer, would be preferred. The hardness of the material comprising the blades 12 is preferably greater than the insulation layer 8a to be stripped, but less than the conductor 8b to avoid inadvertently cutting the latter. For example, various types of polymers could be employed, as well as hard rubbers, porcelains and metals of various types. Still further, a plurality of different blades 12 comprising different materials, hardnesses and groove 14 dimensions could be provided in a kit form with the stripping tool 2 so that it could be adapted for various applications.

IV. First Modified Embodiment Insulation Stripping Tool 102

Figure 5:
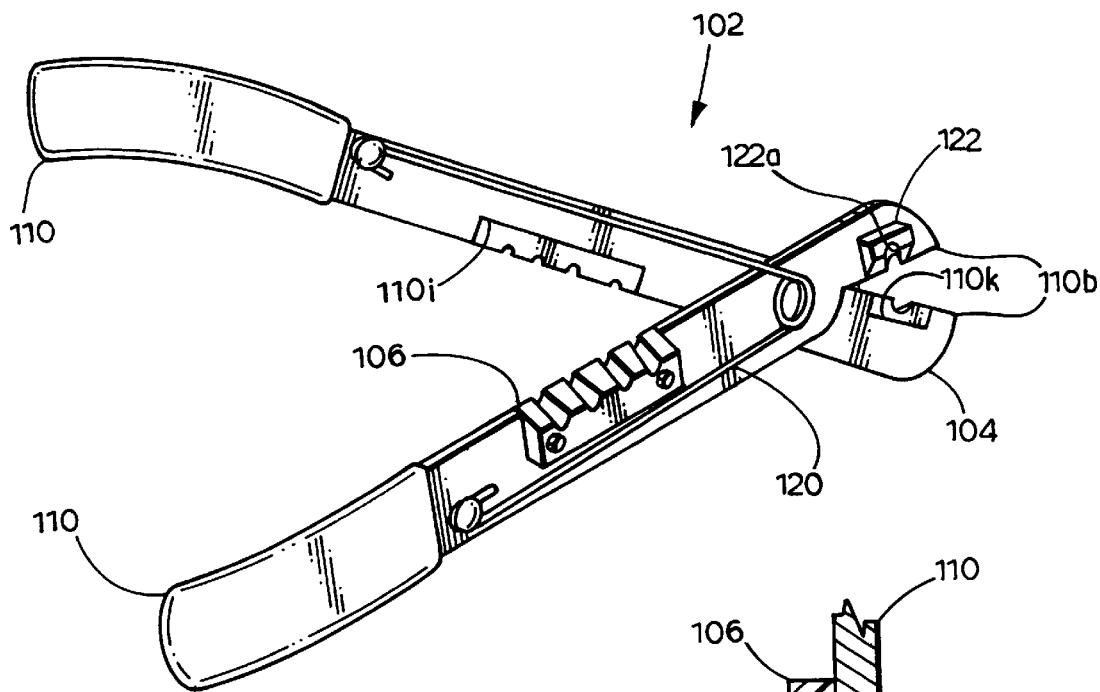
FIG. 5 is a perspective view of an insulation stripping tool comprising a first modified embodiment of the present invention.
Figure 6:
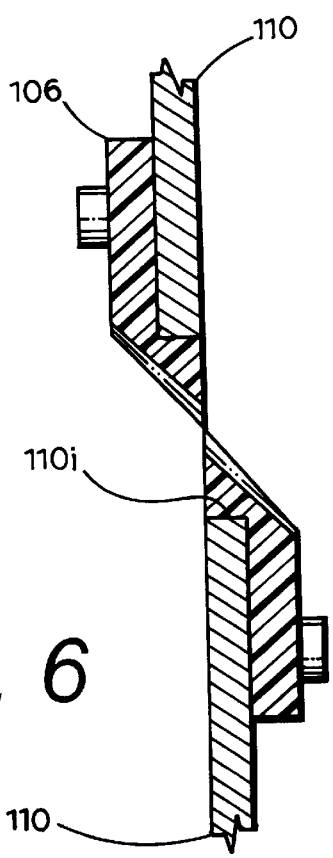
FIG. 6 is an enlarged, transverse, cross-sectional view thereof, with the insulation stripping tool shown in a closed position.
Figure 8:
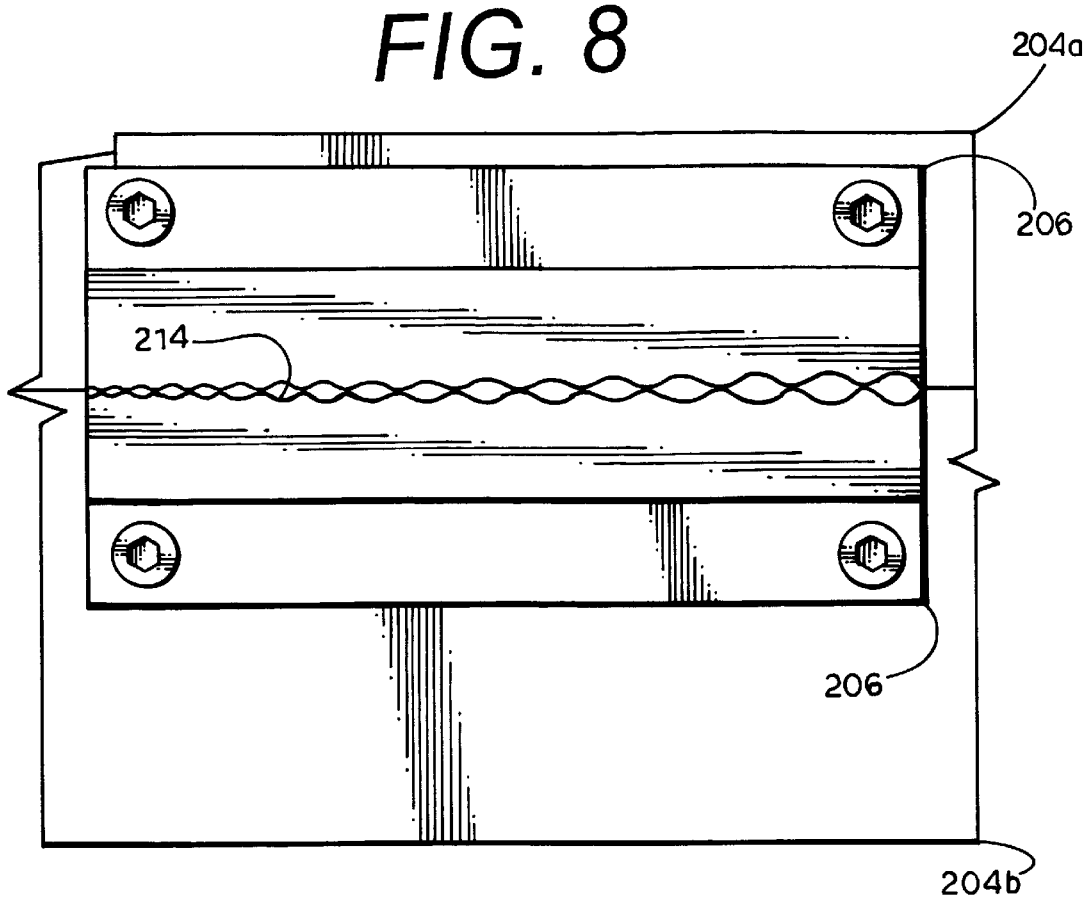
FIG. 8 is an enlarged, side elevational view of the second modified embodiment insulation stripping tool, particularly showing a blade assembly thereof.

An insulation stripping tool 102 comprising a first modified embodiment of the present invention is shown in FIGS. 5 and 6. The insulation stripping tool 102 includes a different form of a plier-type device 104 and an additional pair of blade assemblies 108 located distally on the plier-type device 104. The device 104 includes a pair of longitudinal members 110 pivotally interconnected and biased towards an open, spread-apart position by a spring 120. A proximate pair of notches 110i are formed in the members 110 and a distal pair of notches 110k are formed in the members 110 adjacent respective distal ends 110b thereof.

The proximate notches 110i receive respective proximate blade assemblies 106 which are similar to the blade assemblies 6 described above. The distal notches 110k receive distal blade assemblies 122 each having a single groove 122a. The proximate and distal blade assemblies 106, 122 are oriented in opposite directions with respect to each other to accommodate the flat configurations of the device longitudinal members 110, which are adapted to slidingly engage each other along most of the lengths of their inner faces. The previously described insulation stripping tool 2, on the other hand, utilizes blade assemblies 6 which are oriented the same way.

V. Second Modified Embodiment Insulation Stripping Tool 202

Figure 7:
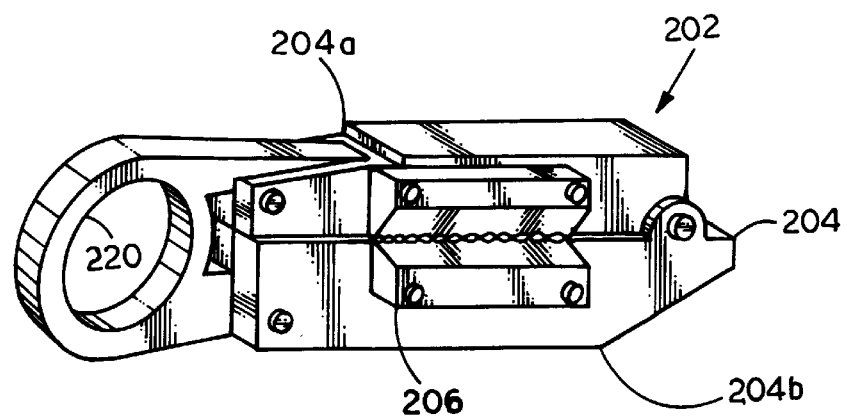
FIG. 7 is a perspective view of an insulation stripping tool comprising a second modified embodiment of the present invention.

FIG. 7 shows an insulation stripping tool 202 comprising a second modified embodiment of the present invention. The second modified insulation stripping tool 202 is adapted to a rotating wire stripping or cutting device 204 which is commonly used for stripping insulation from and cutting wires and cables. The device 204 clamps on a wire or cable and is rotated around same by means of the thumb hole 220.

The second modified embodiment insulation stripping tool 202 incorporates a pair of blade assemblies 206 mounted on jaws 204*a,b* of the device 204. The blade assemblies 206 can include multiple grooves 214 with varying widths and depths, which are similar in configuration to the blade grooves 14*a,f* described above. Alternatively, the blade assemblies 206 can have other edge configurations, such as straight, scalloped, sawtooth, etc.

VI. Operation

In operation, the insulation stripping tools 2, 102 and 202 can be utilized for stripping the insulation from a wide variety of different types of wires and cables, including single-conductor wires, twisted strand wires and fiber optic cables. As discussed above, the blades 6, 106 and 206 thereof are designed for relatively easy installation and removal to facilitate changing blades for different applications. The spacing, shapes and configurations of the blade grooves 14*a–f* and 122*a* can vary according to the requirements of particular applications of the insulation stripping tools 2, 102 and 202. For example, the grooves could be very closely spaced together to facilitate stripping insulation from ribbon cable. Alternatively, the blade edges could assume some other suitable configuration for stripping insulation from other types of conductors. For example, the blade edge configurations could be straight, scalloped, sawtooth, etc.

The range of materials which can be used for fabricating the blades 6, 106, 122 and 206 is also relatively wide. Thus, the blades can comprise various suitable materials, such as plastic, polymeric, porcelain, metal, etc. Moreover, the blades can be formed integrally with and can comprise the same materials as the lever members or other components of the insulation stripping tool. Thus, the blades can be fabricated separately or integrally with the other components of the insulation stripping tool. Moreover, the blades in a single tool can be different materials to maximize the insulation-cutting capabilities of one blade and utilize a softer material for the other to protect the conductor.

The relatively easy replacement capabilities for the blades 6, 106 and 206 can extend the useful life of the insulation stripping tools 2, 102 and 202. As the blades dull from use, they can be replaced. In operation the blades are designed to penetrate the insulation material surrounding the harder conductors, yet have sufficient resiliency to avoid damaging the conductors.

It is to be understood that while certain forms of the present invention have been illustrated and described herein, it is not to be limited to the specific forms or arrangement of parts described and shown.

What is claimed and desired to be secured by Letters Patent is as follows:

1. A tool for stripping insulation from a wire conductor, which comprises:

(a) first and second members each having a proximate handle end, a distal end and inner and outer longitudinal edges extending between the ends;

(b) each said member having inner and outer faces, a portion of each said member inner face being positioned in opposed relation to a portion of the other member inner face;

(c) pivotal connection means for pivotally interconnecting said members intermediate their respective proximate and distal ends;

(d) said members having open and closed positions and being pivotal therebetween with respect to each other about said pivotal connection means;

(e) said first and second members having respective first and second jaws, each said jaw being located at a respective member inner edge intermediate said pivotal connection means and said member proximate handle end;

(f) each said jaw having a notch open at a respective member inner edge;

(g) first and second blade assemblies each having a blade with an edge, a groove extending across said blade and open at the edge thereof and blade assembly mounting means for mounting said blade assembly on a respective jaw with said blade assembly at least partly received in a respective notch;

(h) said blade assembly edges being located adjacent to each other with said members in their closed positions; and (i) each said groove forming an opening at a respective blade edge, said openings being aligned with each other with said members in their closed positions whereby said blades are adapted for stripping insulation from a wire conductor and said aligned openings are adapted for passing the wire conductor therethrough, said blades comprising a polymeric material.

* * * * *